United States Patent [19]

Cribbs et al.

[11] Patent Number: 5,369,194
[45] Date of Patent: Nov. 29, 1994

[54] OLEFIN POLYMERIZATION METHOD

[75] Inventors: Leonard V. Cribbs, Houston, Tex.; Michael W. Lynch, Schaumburg, Ill.

[73] Assignee: Quantum Chemical Corporation, Cincinnati, Ohio

[21] Appl. No.: 23,135

[22] Filed: Feb. 24, 1993

Related U.S. Application Data

[60] Division of Ser. No. 923,147, Jul. 31, 1992, abandoned, which is a continuation of Ser. No. 712,206, Jun. 7, 1991, Pat. No. 5,155,079.

[51] Int. Cl.$^5$ .............. C08F 2/06; C08F 4/64; C08F 4/68
[52] U.S. Cl. .................. 526/116; 526/114; 526/125; 526/129; 526/153; 526/348.6; 526/352; 502/113
[58] Field of Search ............... 526/114, 116

[56] References Cited

U.S. PATENT DOCUMENTS

| | | | |
|---|---|---|---|
| 4,325,835 | 4/1982 | Hartshorn et al. | 252/429 B |
| 4,381,253 | 4/1983 | Shipley | 252/431 C |
| 4,435,518 | 3/1984 | Pennington et al. | 502/107 |
| 4,554,265 | 11/1985 | Graves | 502/113 |
| 4,578,373 | 3/1986 | Graves | 526/114 |
| 4,611,038 | 9/1986 | Brun et al. | 526/169.2 |
| 4,659,685 | 4/1987 | Coleman, III et al. | 502/113 |
| 4,672,096 | 6/1987 | Nowlin | 526/116 |
| 4,701,432 | 10/1987 | Welborn, Jr. | 502/113 |
| 4,710,552 | 12/1987 | Bachl et al. | 526/116 |
| 4,831,090 | 5/1989 | Bachl et al. | 526/116 |
| 4,866,021 | 9/1989 | Miro et al. | 502/113 |
| 4,918,038 | 4/1990 | Samuels et al. | 502/112 |
| 5,070,055 | 12/1991 | Schramm et al. | 502/107 |

FOREIGN PATENT DOCUMENTS

| | | |
|---|---|---|
| 314165 | 5/1989 | European Pat. Off. |
| 324586 | 7/1989 | European Pat. Off. |
| 55-151009 | 11/1980 | Japan |
| 785314 | 10/1957 | United Kingdom |
| WO8901497 | 2/1989 | WIPO |

OTHER PUBLICATIONS

Chemical Abstracts, vol. 94, No. 8 (Apr. 1981), abstract No. 122291g.

Primary Examiner—Joseph L. Schofer
Assistant Examiner—David Wu
Attorney, Agent, or Firm—William A. Heidrich

[57] ABSTRACT

A multiple site solid catalyst component capable of producing polyolefins having a broad or multimodal molecular weight distribution, such as a bimodal molecular weight distribution, is prepared by contacting a particulate solid support with a zirconium compound or complex to bind the zirconium compound or complex to the support, optionally followed by contacting the supported zirconium compound or complex with a Lewis acid to produce an intermediate product, optionally isolating and washing the supported zirconium compound or complex or resulting intermediate product to remove soluble by-products therefrom, and reacting the washed or unwashed supported zirconium compound or complex or intermediate product with a titanium or vanadium compound to produce a solid catalyst component.

40 Claims, No Drawings

OLEFIN POLYMERIZATION METHOD

This is a division of copending, commonly assigned application Ser. No. 07/923,147, filed Jul. 31, 1992, now abandoned, which is a continuation of application Ser. No. 07/712,206 filed Jun. 7, 1991, now U.S. Pat. No. 5,155,079 issued Oct, 13, 1992, the entire disclosure of which is incporporated herein by reference.

BACKGROUND OF THE INVENTION

1. Field of the Invention

This invention relates to olefin polymerization catalysts and methods and, more particularly, the invention relates to supported olefin polymerization catalysts having multiple catalytic sites that are capable of producing product polymer having broad or multimodal molecular weight distributions in a single reactor, and processes for making such polymers.

2. Description of Related Technology

Polyolefins, such as high density polyethylene (HDPE), having broad, and preferably multimodal (e.g. bimodal) molecular weight distributions ("MWDs") are useful for high molecular weight film and blow molding applications. Prior systems for the preparation of such polymers have utilized multiple reactors or catalysts which comprise mixtures of individual catalysts intended to produce polymers of differing molecular weights.

In multi-reactor systems, the olefin or olefins are sequentially polymerized in reactors containing catalysts known to produce polymers having relatively low and relatively high molecular weights, in an attempt to produce a product polymer mix having a broad or multimodal molecular weight distribution.

In some cases, attempts have been made to produce a broad or multimodal MWD product polymer in a single reactor using a mixture of two (or more) supported catalysts, each of which is known to produce a polymer having a target average molecular weight which differs significantly from that produced by the other of the catalysts. These attempts have met with only limited success for a variety of reasons.

One characteristic of prior mixed catalyst systems is that polymers of different molecular weights are formed by separate catalyst particles, which may limit mixing of polymers formed by such systems.

SUMMARY OF THE INVENTION

It is an object of the invention to overcome one or more of the problems described above.

According to the present invention, a supported solid catalyst component useful for making broad or multimodal MWD polymers in a single reactor is provided. The catalyst presents multiple catalytic transition metal species supported on the same particle and enables efficient, readily controllable polymerization of one or more 1-olefins in a single reactor under a variety of conditions.

The solid catalyst component of the invention is active in combination with a suitable cocatalyst and, in some cases, in combination with a suitable cocatalyst and a modifier, in polymerizing 1-olefins, and is prepared by contacting particles of a solid support material with a zirconium compound or complex under conditions whereby the zirconium compound or complex reacts with or precipitates on the surface of the support material, optionally followed by contacting the resulting product with a Lewis acid to produce an intermediate product. The supported zirconium compound or complex or the intermediate product is preferably isolated and washed to remove soluble reaction by-products, and in any event is reacted with a compound of titanium or vanadium to produce a solid catalyst component.

When combined with a suitable cocatalyst or a suitable cocatalyst and a suitable modifier, as appropriate, the solid catalyst component forms a catalyst system which is useful in polymerizing 1-olefins.

A method of producing polyolefins by polymerizing 1-olefins by contact with the catalyst system under polymerizing conditions is also provided.

The catalyst component, catalyst system, and polymerization method of the invention allow the preparation of polyolefins having broad or multimodal molecular weight distributions in a single reactor. Some forms of the inventive catalyst system are especially responsive to the presence of hydrogen, for ready control of molecular weight.

Since high and low molecular weight polymers are formed by the same catalyst particle, polymer mixing occurs at the molecular or near molecular level, which is believed to have a beneficial effect on polymer properties.

Other objects and advantages of the invention will be apparent to those skilled in the art from the following detailed description, taken in conjunction with the appended claims.

DETAILED DESCRIPTION OF THE INVENTION

According to the invention, a solid catalyst component active in combination with a suitable cocatalyst or a suitable cocatalyst and a modifier in polymerizing one or more 1-olefins is prepared by a method including the following steps:

(a) contacting particles of a solid support material with a zirconium compound or complex under conditions whereby the zirconium compound or complex reacts with or precipitates on the surface of the support material;

(b) optionally contacting the product of step (a) with a Lewis acid to produce an intermediate product;

(c) optionally isolating and washing the product of step (a) or the intermediate product of step (b) to remove soluble reaction by-products therefrom; and, (d) reacting the product of step (a), (b) or (c) with a compound of titanium or vanadium to produce a solid catalytic product.

In preferred forms, the zirconium compound or complex and the Lewis acid form a reaction product which binds to or precipitates on the support surface. Further, in preferred forms, the intermediate product of step (b) is contacted with an alkylating agent prior to step (c).

The zirconium compound or complex is preferably a tetravalent zirconium compound, such as a halide, alkoxide, alkoxy halide, aryl, or alkaryl compound. Suitable tetravalent zirconium compounds and complexes include tetrabenzyl zirconium (a homoleptic organozirconium material), $Zr(OR)_4 \cdot (R^1OH)_x$ where R and $R^1$ are independently $C_1$–$C_{20}$ (preferably $C_1$–$C_{10}$, highly preferably $C_1$–$C_4$) alkyl, aryl or alkaryl groups and x is zero or a positive number and alkoxy, alkyl, aryl and alkaryl halides such as $ZrR_aX_{4-a}$ and $Zr(OR)_aX_{4-a} \cdot (R^1OH)_x$ where a is zero or a positive integer of 1 to 4, inclusive, and X is halogen, preferably chlorine. Preferred alkoxy halides include those of the formula $Zr(OR)_2Cl_2$.

Specific useful compounds include $ZrCl_4$, $Zr(OC_4H_9)_2Cl_2$, and $Zr(OC_4H_9)_4 \cdot (C_4H_9OH)$.

In the case of zirconium alkoxides of the formula $Zr(OR)_4 \cdot (R^1OH)_x$ between 0 and about 3 moles of $C_1$–$C_{20}$ (preferably $C_1$–$C_{10}$, and highly preferably $C_1$–$C_4$) alcohols (generally an average of about 1.5 moles) are typically complexed with each mole of the zirconium alkoxide.

Tetrabutoxy zirconium and tetrapropoxy zirconium compounds and complexes are preferred.

Tetrabenzyl zirconium and other homoleptic organozirconium complexes are preferably used in combination with halogenated vanadium compounds and an inorganic support material. Tetrabenzyl zirconium generally provides product polymer having higher melt indexes than products obtained with otherwise similar catalysts not using homoleptic organozirconium complexes.

The step of contacting the solid support particles with the zirconium compound or complex is conveniently and preferably carried out in the presence of an inert hydrocarbon liquid, such as heptane, in which the zirconium compound or complex is soluble.

The amount of zirconium compound or complex contacted with the support may vary from greater than 0 to about 3 mmoles of zirconium compound or complex per gram of support material, and is preferably about 1 mmole zirconium compound or complex per gram of support. The reaction is preferably carried out at room temperature but may be carried out at any convenient temperature lower than the boiling point of the solvent or the decomposition temperature of any complex formed during the reaction. An elevated temperature of 60° C. is suitable.

The contact product obtained by contacting the support material with the zirconium compound or complex is preferably then contacted with one or more Lewis acids to produce an intermediate product. This reaction is preferably carried out in an inert hydrocarbon medium, highly preferably in the reaction mixture obtained from the first step. Preferably, a molar excess of the Lewis acid with respect to the zirconium compound or complex is used.

The Lewis acid is preferably selected from the group consisting of metallic halides, organometallic halides, compounds of the formula $SiX_bR^2_{4-b}$ where b is an integer from 1 to 4, inclusive, $R^2$ is hydrogen or an alkyl group of 1 to 10 carbon atoms, and X is halogen, preferably chlorine, and mixtures of the foregoing.

Preferred Lewis acids include compounds of the following formulas wherein X is halogen, preferably chlorine $SiX_4$; $R^3_cAlX_{3-c}$ where $R^3$ is an alkyl group of 1 to 10 carbon atoms and c is 1 or 2; $R^4_3Al_2X_3$ where $R^4$ is an alkyl group of 1 to 4 carbon atoms; and $MX_d$ where M is a metal and d is the valence of M. Suitable alkyl aluminum halides include $R^3AlCl_2$ (e.g. ethylaluminum dichloride, EADC) $R^3_2AlCl$ (e.g. diethylaluminum chloride, DEAC), and $R^4_3Al_2Cl_3$ (e.g. ethylaluminum sesquichloride, EASC). A useful metal halide is $BCl_3$.

The Lewis acid accomplishes one or more functions, including ligand exchange with the zirconium moiety of the support/zirconium compound or complex contact product, preferably to halogenate the zirconium moiety. Such ligand exchange with the zirconium species generally improves the activity thereof as the number of zirconium-halide bonds increases.

If the zirconium complex includes alcohol, excess free and coordinated alcohol may be removed by reaction with the Lewis acid to produce a soluble reaction product which may be removed in a subsequent filtration and wash step.

In some cases, the Lewis acid functions to improve the hydrogen response of the ultimate catalyst.

The Lewis acid is preferably used in molar excess with respect to the amount of zirconium in the contact product, and preferably at a molar ratio of about 2 to about 10 moles of Lewis acid per mole of zirconium compound or complex. The reaction between the Lewis acid and the zirconium compound or complex can be carried out at room temperature (e.g. about 25° C.) or, if desired, at an elevated temperature (e.g., 60° C.) up to the decomposition temperature of the reactants. The reaction rate increases with increasing temperature.

The solid support material is preferably, but need not be, porous, and may be reactive or non-reactive with the zirconium compound or complex or the reaction product of the Lewis acid and the zirconium compound or complex. Non-reactive supports are those which will support a precipitated solid zirconium compound or complex/Lewis acid reaction product, while a reactive support may be one which has reactive surface hydroxyl or oxide groups.

Suitable support materials include MgO, $MgCl_2$, alumina, and silica or silica/alumina having the general formula $SiO_2 \cdot hAl_2O_3$ wherein h is typically 0 to about 2.

If a silica support is used, it may be calcined at an elevated temperature (e.g., 200°–900° C.) prior to use.

If desired, the support may be porous with a high surface area.

The intermediate product obtained by contacting the Lewis acid with the support material/zirconium compound or complex contact product is optionally reacted with an alkylating agent in order to improve, or further improve, catalyst characteristics including hydrogen response and activity. A large molar excess of the alkylating agent with respect to zirconium is not needed, but a molar ratio of about 1 to about 2 moles of alkylating agent to mole of zirconium is preferred.

Suitable alkylating agents include trialkyl aluminum, dialkyl magnesium, and dialkyl zinc compounds such as diethyl zinc.

In practice, this step is usually carried out at a moderately elevated temperature such as 60° C., although the temperature is not critical. Reaction times of less about one hour are preferred, since long reaction times may adversely affect reactivity, hydrogen response, and/or thermal stability.

Regardless of whether the alkylating step is carried out following formation of the intermediate product, the intermediate product (or, if no Lewis acid has been introduced, the supported zirconium compound or complex) is preferably, but not necessarily, isolated and optionally may be washed to remove soluble or dispersible reaction by-products therefrom. These steps may enhance reactivity and minimize or eliminate reactor fouling in slurry reaction procedures by removing soluble species of by-products, some of which may be active. Such active species may include transition metal alkoxides which can act as oligimerization catalysts under some conditions.

The isolation or separation step may be carried out by any convenient means such as by filtration, decantation, centrifuging, or sublimation, as desired. Washing is conveniently effected by the use of an inert liquid hydrocarbon, such as heptane.

The washed or unwashed intermediate product or supported zirconium compound or complex is then contacted with a compound of titanium or vanadium to produce a solid catalyst component. This step is preferably carried out in an inert liquid hydrocarbon medium, as by reslurrying the solid intermediate product in heptane or another hydrocarbon. As such, the titanium compound is one which is chosen to be dispersible or, preferably, soluble in the hydrocarbon medium. Such compounds include tetravalent vanadium compounds such as vanadium tetrachloride ($VCl_4$), and $V^{+5}$ compounds such as vanadyl chloride ($VOCl_3$). Suitable compounds include tetravalent titanium compounds of the formula $Ti(OR^5)_e X_{4-e}$, and vanadium compounds of generalized formulas $VO(OR^5)_f X_{3-f}$, and $V(OR^5)_g X_{4-g}$, and mixtures thereof, wherein each $R^5$ is the same or different alkyl group of 1–20 carbon atoms, e and g are each zero or an integer of 1 to 4, inclusive, f is zero or an integer of 1 to 3, inclusive, and X is halogen, preferably chlorine. $TiCl_4$ is an especially suitable titanium compound. Halogenated titanium and vanadium compounds are preferred for convenience.

Where it is desired to carry out the vanadium reaction in a hydrocarbon solvent, hydrocarbon soluble vanadium compounds are preferred. $V^{+4}$ and $V^{+5}$ compounds are hydrocarbon soluble, and are preferred. Trivalent vanadium compounds generally are not hydrocarbon soluble. Vanadium compounds of any valence can be used, however.

Different vanadium compounds, however, behave differently in the inventive catalyst. $VCl_4$ provides a broader MWD than does $VOCl_3$, while $VOCl_3$ provides higher reactivity, in general.

$VCl_4$ and $VOCl_3$ may be used in mixtures of from 0 to 100% of either compound to "tune" (i.e. adjust) the molecular weight distribution as desired.

The relative ratio of vanadium or titanium to zirconium affects the molecular weight distribution of product and the activity of the catalyst. An increase in the ratio generally increases activity, while leading to a narrower molecular weight distribution.

The reaction between the titanium or vanadium compound and the solid intermediate product is very rapid, and an elevated reaction temperature is not necessary. Carrying out the reaction at room temperature under stirring is convenient.

If $VCl_4$ is used as a reactant, it is preferably added as a dilute (0.1–0.5M) solution in heptane (or other hydrocarbon diluent) because $VCl_4$ is relatively unstable, and has a tendency to disproportionate to $VCl_3$, which is insoluble in hydrocarbons. This tendency is less in solution, especially dilute solutions.

The ratio of the titanium or vanadium compound to the support material is widely variable, and is preferably in the range of about 0.01 to about 2 moles of titanium or vanadium compound per gram of support material.

Following reaction with the titanium or vanadium compound where, as preferred, the reaction is carried out in an inert liquid hydrocarbon medium, the resulting catalyst component is separated from the hydrocarbon medium (as by filtration, drying at room temperature, displacement of solvent by a lower boiling point solvent, etc.). It may thus be devolatized to produce a dry, free-flowing catalyst component. Any convenient temperature up to the catalyst decomposition temperature may be utilized for devolatization.

By the foregoing procedure a multiple transition metal site olefin polymerization catalyst component is prepared. It is believed that titanium or vanadium sites of the catalyst component are associated with the ability of the catalyst to produce product polyolefin having a broad molecular weight distribution by producing high melt index, low molecular weight polymer. It is believed that the zirconium site is associated with the ability of the catalyst to produce polymers having high molecular weight (i.e., low melt index, MI) in addition to the broad, typically bimodal or other multimodal molecular weight distribution.

The catalyst component may be used in combination with an effective amount of any of a wide variety of cocatalysts and, if the catalyst contains a vanadium compound, an effective amount of a modifier. Modifiers, sometimes referred to as "promoters" in the art, are typically chosen for their ability to increase and maintain the reactivity of vanadium catalysts, and also affect melt index and melt index ratio (MIR), which is a measure of molecular weight distribution.

Useful modifiers include halogenating agents such as those of the formula $M^2 H_i X_{j-i}$ wherein $M^2$ is Si, C, Ge or Sn (preferably Si or C, and most preferably C), X is halogen (preferably Cl or Br and most preferably Cl), i is 0, 1, 2 or 3, and j is the valence of $M^2$. Such modifiers are disclosed in Miro, et al. U.S. Pat. No. 4,866,021 (Sept. 12, 1989), the disclosure of which is incorporated by reference. Modifiers of this type include chloroform, carbon tetrachloride, methylene chloride, dichlorosilane, trichlorosilane, silicon tetrachloride, and halogenated hydrocarbons containing 1 to 6 carbon atoms such as those available from E. I. dupont de Nemours & Co. under the trade designation Freon (e.g., Freon 11 and Freon 113).

Bachl, et al. U.S. Pat. No. 4,831,090 (May 16, 1989), the disclosure Df which is incorporated by reference, discloses several classes of organohalogen compounds which are useful as modifiers. These include saturated aliphatic halohydrocarbons, olefinically unsaturated aliphatic halohydrocarbons, acetylenically unsaturated aliphatic halohydrocarbons, aromatic halohydrocarbons, and olefinically unsaturated halogenated carboxylates.

Particularly preferred modifiers are halocarbon compounds of the formula $R^6_k CX_{4-k}$ wherein $R^6$ is hydrogen or an unsubstituted or halogen substituted saturated hydrocarbon having from 1 to 6 carbon atoms; X is halogen and k is 0, 1 or 2. Examples of these halocarbon compounds include fluoro-, chloro-, or bromo-substituted ethane or methane compounds having at least two halogens attached to the carbon atom. Especially preferred promoters include $CCl_4$, $CH_2Cl_2$, $CBr_4$, $CH_3CCl_3$, $CF_2ClCCl_3$, with the most especially preferred being $CHCl_3$ (chloroform), $CFCl_3$ (Freon 11) and $CFCl_2CCF_2Cl$ (Freon 113). Mixtures of any of these modifiers may be used.

Selection of modifiers can be used to adjust polymer properties, sometimes at the expense of activity.

Preferred polymer properties may be obtained with a chosen modifier at a ratio of modifier to transition metal which is a compromise to maximum catalyst activity. The product molecular weight distribution and response of melt index to the presence of hydrogen are tunable by choice and concentration of modifier. Activity, melt index ratio (MIR), high load melt index (HLMI), etc. all vary with the ratio of modifier to transition metal, and with the choice of modifier.

Useful cocatalysts include trialkyl aluminum compounds (e.g., triisobutylaluminum, TIBAL, and triethylaluminum, TEAL), other alkyl or alkoxy compounds of zinc or metals of Groups IIA and IIIA of the Periodic Table, and tetraisobutyl dialuminum oxide (TIBAO).

Useful proportions of the cocatalyst to the solid catalyst component range up to about 200 moles cocatalyst per mole of transition metal in the solid catalyst component, with a preferred range of about 15 to about 20 moles (in the case of TIBAL) per mole of total transition metal ("TTM") in the solid catalyst component.

If a modifier is used, up to about 40 or 50 moles modifier per mole TTM in the solid catalyst component may be used, with a preferred ratio of about 20 moles modifier per mole TTM for reactivity reasons. More than 50 moles modifier per mole TTM can be used, but ratios above 50 moles modifier per mole TTM provide insufficient additional benefit to justify the added cost thereof. The preferred ratio may vary within the range of about 1 to about 50 moles modifier per mole TTM for various specific catalyst formulations.

With either of the cocatalyst and modifier ratios, however, departure from the preferred values results in diminshed activity and changes in polymer properties, i.e., MI and MIR. How these properties change differs with different catalyst components of the invention. Polymer properties may be tuned by varying cocatalyst and modifier levels, sometimes with a compromise of activity in order to achieve desired properties.

Product polymers having MIR values varying over a wide range (e.g., about 35–300) and varying MI values are obtainable according to the invention by judicious selection of catalyst formulations.

The polymers obtained by the process of the invention may be homopolymers of ethylene or 1-olefins, or copolymers of 1-olefins as well as copolymers of 1-olefins and ethylene. Examples of useful 1-olefins include those having 3 to 12 carbon atoms, such as propylene, 1-butene, 1-pentene, 1-hexene, 1-octene, 1,3-butadiene and 1,5-hexadiene.

More particularly, the inventive catalyst system may be used to prepare ethylene homopolymers, including HDPE having broad or multimodal molecular weight distributions for applications such as use in high molecular weight film and blow molding.

The inventive catalyst system is suitable for use in slurry reaction conditions, gas phase, and solution polymerization reaction conditions. Polymerization is typically carried out at a temperature of 0° to 250° C., and from atmospheric pressure to 30,000 psig.

The presence of hydrogen in the reaction mixture generally has a negative effect on activity but its presence may be utilized to control polymer molecular weight. Various forms of the inventive catalyst system are especially sensitive to the presence of hydrogen. It is believed that catalyst systems with an "improved" hydrogen response result from the addition of a Lewis acid and/or an alkylating agent such as DEAC or trialkyl aluminum species in catalyst preparation.

The invention allows the use of a single reactor to produce polymer having a broad or multimodal molecular weight distribution, thus lowering capital costs and allowing the use of simplified control systems relative to multiple reactor systems.

EXAMPLES

The practice of the invention will be illustrated by reference to the following specific examples, which are not to be understood to limit the scope of the invention.

A series of solid catalyst components, designated herein as "Catalysts A-L" were prepared and tested with suitable cocatalysts (and with modifiers (promoters) for vanadium-containing catalysts) in the homopolymerization of ethylene to produce high density polyethylene (HDPE) and, in the case of Catalyst K, copolymerization of ethylene with butene-1 in addition to homopolymerization.

Catalyst Preparation Procedure

All catalyst precursors and catalysts were handled utilizing standard Schlenk and glovebox techniques.

Tetrakis(n-propoxy)zirconium, diethyl zinc (DEZ), tetrakis(n-butoxy)zirconium, vanadium tetrachloride, and vanadyl chloride were used without purification. To minimize decomposition, the $VCl_4$ cylinder was stored at $-25°$ C. and 0.5M stock solutions in heptane were stored at 0° C. Vanadyl chloride was also used in the form of diluted heptane solutions. Heptane was purified by sparging with dry, oxygen free nitrogen and passage over 13X Linde molecular sieves. Silicon tetrachloride was used as received from the source; chloroform was degassed with nitrogen and allowed to set at least 24 hrs. over Linde 13X molecular sieves prior to being diluted with heptane. Freon 11 and Freon 113 were treated similarly.

The aluminum alkyls, diethylaluminum chloride (DEAC), ethylaluminum dichloride (EADC), ethylaluminum sesquichloride (EASC), triisobutylaluminum (TIBAL), and tri-n-hexylaluminum (TNHAL), were purchased as non-pyrophoric heptane solutions and used as received.

Catalysts A–D, H, and L were prepared according to the following generalized procedure, with complete details given in Table I. As Step 1, the support material was prepared as set forth below, and then slurried in heptane (Step 2). Thereafter, a zirconium alkoxide was added to the mixture (Step 3). After stirring for the designated times and temperatures, a Lewis acid was added to complex the alcohol and in some cases provide halide exchange with the zirconium site (Step 4). During this step, appropriate times and temperatures were also observed. After Step 4, the mixtures were filtered several times to remove undesirable soluble species (Step 5), and the vanadium component was added (Step 6). The mixtures were then stirred for a suitable period and a solid component recovered by devolatilization at 100° C. under a stream of nitrogen (Step 7).

Support Preparation

The silica catalyst supports, Davison 952 and Davison 948 silica from W. R. Grace, and Catapal A (alumina from Vista Chemical) were dried and partially dehydroxylated by heating in a quartz, fluidized bed with a dry, oxygen-free nitrogen stream, as follows.

Davison 948 and 952 Silica (300° C.)

About 25 g of Davison 948 or 952 silica was charged to a quartz column and nitrogen was passed through the column at a rate sufficient to fluidize the silica. The temperature of the column was increased from 25° C. to 300° C. over 4 hours, held at 300° C. for 12 hours, and then decreased to 25° C. over 4 hours. The silica was recovered using standard airless techniques and transferred to a glovebox.

Catapal A Alumina (500° C.)

About 25 g of the alumina was charged to the quartz column and nitrogen passed through the column at a rate sufficient to fluidize the alumina. The temperature of the column was increased from 25° C. to 150° C. over 2 hours and held +at 150° C. for 2 hours. The temperature was then increased from 150° C. to 500° C. over 4 hours and held at 500° C. for 10 hours. The temperature was then decreased to 25° C. over 8 hours. The alumina was recovered and stored in the glovebox.

The formulations, including preparation and procedural steps for Catalysts A–D, H and L are set forth in Table I, below.

to the slurry. The flask was immersed in an oil bath and heated to 60° C. for 40 min. After removing the flask from the oil bath, 4.70 ml of 3.366M EADC (2.01 g, 15.8 mmoles) was added to the stirred slurry. The flask was returned to the 60° C. bath and maintained for 55 min. The flask was then removed from the bath and filtered and washed 3 times with about 50 ml of heptane. After the final wash, about 50 ml of heptane was added to slurry the components and 8.97 ml of 0.706 M TNHAL (1.79 g, 6.33 mmoles) was added by syringe. The mixture turned red-brown immediately and then to a brown-black color. After stirring at room temperature for 40 min, a black solution was observed above the black solids. The flask was then placed in the 60° C. bath and maintained for 40 min. After removing the flask to room temperature, 6.33 ml of 0.5M $VCl_4$ in

TABLE I

CATALYST FORMULATIONS[1]

| | Step 1 | | Step 3 | | | Step 4 | | | Step 5 | Step 6 | | |
|---|---|---|---|---|---|---|---|---|---|---|---|---|
| Catalyst | Support | Temp (°C.) | $Zr(OR)_4$ | Temp (°C.) | Time[2] | Lewis Acid | Temp (°C.) | Time[2] | Filter | V | Temp (°C.) | Time[2] |
| A | 952 | 300 | 1 $Zr(OPr)_4$ | 60 | 50 m | 4 EADC | 60 | 60 m | 4X | 2 $VCl_4$ | 25 | 16 h |
| B | 952 | 300 | 1 $Zr(OPr)_4$ | 60 | 60 m | 5 EASC | 60 | 2 h | 3X | 2 $VCl_4$ | 25 | 2.5 h |
| C | 952 | 300 | 1 $Zr(OPr)_4$ | 80 | 60 m | 10 $SiCl_4$ | 80 | 4 h | 3X | 2 $VCl_4$ | 25 | 4 h |
| D | 948 | 300 | 1 $Zr(OBu)_4$ | 60 | 80 m | 5 DEAC | 60 | 15 m | 4X | 2 $VCl_4$ | 25 | 100 m |
| H | 948 | 300 | 1 $Zr(OBu)_4$ | 60 | 75 m | 5 DEAC | 60 | 25 m | 4X | 2 $VOCl_3$ | 60 | 50 m |
| L | Catapal A | 500 | 1 $Zr(OBu)_4$ | 60 | 70 m | 5 DEAC | 60 | 15 m | 4X | 2 $VCl_4$ | 25 | 115 m |

[1]Reactants in mmoles component/g $SiO_2$
[2]Time in minutes (m) or hours (h)

Catalysts E–G and I–K were prepared as follows.

Catalyst E

In the glovebox, 3.609 g of Davison 948 silica (300° C.) was transferred into a Schlenk flask equipped with a mechanical stirrer. The Schlenk flask was transported to the Schlenk line and about 50 ml of heptane added to slurry the silica. Using a syringe, 1.5 ml of $Zr(OBu)_4$:BuOH (1.741 g, 3.80 mmoles) was added to the stirred slurry. The flask was then immersed in an oil bath and heated to 60° C. for 80 min. After removing the flask from the oil bath, 4.1 ml of neat $SiCl_4$ (6.13 g, 36.1 mmoles) was added to the flask by syringe. During the silane addition, a slight yellowing of the solution was observed. The flask was returned to the 60° C. bath and maintained for 115 min. The flask was next removed from the bath and 5.4 ml of 0.706M TNHAL (1.07 g, 3.81 mmoles) added to the stirred slurry at room temperature. The color changed from white to red-brown within five minutes and then to brown. After stirring at room temperature for 65 min, the mixture was filtered and washed with heptane 4 times. The wet solid was allowed to sit for 16 hours and then slurried again in about 50 ml heptane. By syringe, 14.4 ml of 0.5M $VCl_4$ in heptane (1.39 g, 7.20 mmoles) was added to the stirred slurry. The resulting red-brown mixture was stirred at room temperature for 90 min and then shut down overnight. The flask was immersed in an oil bath and heated to 100° C. under a nitrogen purge to remove the volatiles. In the dry box, 5.104 g of a dark grey-brown solid was recovered.

Catalyst F

In the glovebox, 3.165 g of Davison 948 silica (300° C.) was added to a Schlenk flask equipped with a mechanical stirrer. The flask was removed to a Schlenk line and the silica slurried in about 50 ml of heptane. While stirring at room temperature, 1.32 ml (1.45 g, 3.17 mmoles) of neat $Zr(OBu)_4$.BuOH was added by syringe heptane (0.610 g, 3.165 mmoles) was added to the slurry by syringe. The mixture was stirred at room temperature for 55 min. and allowed to sit unstirred for 16 hours. The volatiles were next removed by heating to 100° C. with a nitrogen stream passing through the flask. 4.30 g of a brown solid was recovered.

Catalyst G

In the glovebox, 3.47 g of Davison 952 silica (300° C.) was added to a Schlenk flask equipped with a mechanical stirrer. The flask was removed to the Schlenk line and about 50 ml of heptane added. By syringe, 1.32 ml of neat $Zr(OPr)_4$.PrOH (1.45 g, 3.47 mmoles) was added to the slurry and the temperature was increased to 60° C. After maintaining 60° C. for 105 min., 3.98 ml of neat $SiCl_4$ (5.90 g, 34.7 mmoles) was added by syringe to the mixture. The temperature was maintained at 60° C. for 120 min following the addition. The flask was then removed from the oil bath and the mixture filtered and washed with heptane twice. About 50 ml heptane was added to slurry the solids followed by the addition of 3.47 ml (0.428 g, 3.47 mmoles) of 1M diethyl zinc (DEZ). No color change was observed at this point. This mixture was stirred at 25° C. for 16 hours. By syringe, 13.9 ml of 0.5M $VCl_4$ in heptane (1.34 g, 6.95 mmoles) was added to the slurry at 25° C. The color changed from off-white to yellow and finally to dark brown. The mixture was stirred at 25° C. for 5 hours and then devolatilized at 100° C. under a nitrogen stream. Recovery yielded 5.28 g of a free flowing purple-brown solid.

Catalyst I

Into a nitrogen purged flask were transferred 3.203 g of Davison 948 silica dried at 300° C. for 13 hours. The silica was slurried in 50 ml heptane and 1.110 g (3.14 mM) of $Zr(OBu)_4$.BuOH was added. The catalyst was stirred at 60° C. for 30 minutes. Then the flask was removed from the oil bath and 3.67 ml of neat SiCl₄ were added and stirred 1 hour at 60° C. The catalyst was filtered and washed 1 time with 100 ml heptane and filtered again. The solids were reslurried in heptane and 8.8 ml. of 0.73M Mg(Bu)₂ added and stirred at 25° C. for 20 minutes then 0.7 mls. of TiCl₄ were added. The catalyst was then stirred for 110 minutes at 25° C. The catalyst was filtered and dried with a N₂ purge at 25° C. The catalyst was a red solid.

Catalyst J

Into a nitrogen purged flask was introduced 3.042 g of Davison 948 silica dried at 300° C. for 12 hours. Next 1.467 g of tetrabenzylzirconium was added followed by 50 ml toluene. (The tetrabenzylzirconium was prepared from ZrCl₄ and C₆H₅CH₂MgCl using methods described in J. Organometallic Chem. 26,357 (1971)). The reaction mixture was stirred 2 hours at room temperature. The solvent was removed under vacuum to yield a light golden-yellow solid, and replaced by 50 ml of heptane. Then 12.2 ml of a 0.5M heptane solution of VCl₄ were added and stirred at room temperature for 2.5 hours. The flask was placed in an oil bath at about 110° C. and the solvent removed with a stream of N₂. The catalyst was a free-flowing purple solid.

Catalyst K

Into a nitrogen purged flask was introduced 3.23 g of Davison 948 silica dried 6 hours at 200° C. followed by 50 ml heptane. Next 0.7 ml (0.5 mM/g SiO₂) of Zr(O-Bu)₄ was added and then stirred 75 minutes at 60° C. The reaction mixture was cooled to room temperature and 10.5 ml of a 1.541M solution of DEAC were added. The flask was placed in an oil bath and heated at 60° C. for 30 minutes. The reaction mixture was then filtered and washed 4 times with 50 ml of heptane. The catalyst was reslurried in heptane and 6.46 ml of a 0.5M solution of VOCl₃ were added. The reaction mixture was stirred 1 hour at room temperature. The flask was placed in an oil bath at 105° C. and the solvent was removed with a nitrogen purge. The final catalyst was a lavender free-flowing powder.

Table II, below, summarizes the elemental compositions, respectively, of Catalysts A–H and L.

TABLE II

| | CATALYST COMPOSITION[1] | | | | | | | | | | | |
|---|---|---|---|---|---|---|---|---|---|---|---|---|
| | SiO₂ | | Zr | | Al | | V | | Cl | | Other | |
| Catalyst | mmoles g | wt. % | mmoles g | wt. % | mmoles g | wt. % | mmoles g | wt. % | mmoles g | wt. % | mmoles g | wt. % |
| A | 9.80 | 58.9 | 0.42 | 3.80 | 0.73 | 1.96 | 0.97 | 4.96 | — | — | | |
| B | 8.99 | 54.0 | 0.41 | 3.75 | 0.77 | 2.08 | 1.03 | 5.26 | — | — | | |
| C[2] | 10.3 | 62.0 | 0.59 | 5.38 | — | — | 1.13 | 5.70 | — | — | | |
| D | 8.29 | 49.8 | 0.34 | 3.09 | 0.67 | 1.80 | 1.16 | 5.90 | — | — | | |
| E[2] | 9.45 | 56.8 | 0.50 | 4.55 | 0.36 | 0.96 | 1.07 | 5.54 | — | — | | |
| F | 7.99 | 48.0 | 0.37 | 3.38 | 1.52 | 4.09 | 0.40 | 2.02 | 3.86 | 13.7 | | |
| G | 9.00 | 54.1 | 0.46 | 4.19 | — | — | 1.04 | 5.30 | — | — | Zn 0.60 | 3.91 |
| H | 9.67 | 58.1 | 0.38 | 3.50 | 0.59 | 1.6 | 1.3 | 6.7 | 2.19 | 7.78 | | |
| L[3] | — | — | 0.35 | 3.17 | 10.2 | 27.6 | 1.32 | 6.7 | 5.30 | 18.8 | | |

[1]Final catalyst composition = mmoles/g catalyst and weight percent of catalyst
[2]Value for SiO₂ includes contribution from SiCl₄
[3]Total Al = Al₂O₃ + DEAC

Polymerization Procedure

Ethylene polymerizations were conducted in a 1-liter reactor or a 2-liter reactor, as specified, at 100° C. and a total pressure of 500 psig. Cocatalyst (TIBAL except in one case where TEAL was used) was added directly to the hot reactor by syringe and then isobutane was added from a measured sight glass. Hydrogen was added to the reactor by measuring a pressure drop from a stainless steel vessel. The reactor pressure was then raised to run conditions by the addition of ethylene. Solid catalyst and promoter (chloroform, CHCl₃, except where indicated) were each added to a stainless steel vessel and injected into the reactor at run conditions by high pressure nitrogen. Ethylene was supplied on demand during the course of a typical 60 minute polymerization. At the end of the run, polymerization was terminated by relieving the pressure from the reactor and either opening the 1-liter reactor to recover the polymer or venting the contents of the 2-liter reactor through a bottom dump valve to a catch pot. The recovered polymer was stabilized by the addition of a 1 wt. % solution of butylated hydroxytoluene (BHT). The melt index and high load melt index of product polymer were determined in accordance with ASTM D-1238, Conditions 190/2.16 and 190/21.60, respectively.

Results

Polymerization results for Catalysts A–L (runs 1–31) are set forth in Table III, below.

TABLE III

| | | POLYMERIZATION RESULTS | | | | | | |
|---|---|---|---|---|---|---|---|---|
| Run | Catalyst | H₂ (psig) | TIBAL/TTM | Promoter/TTM | MI | HLMI | MIR | gPE/ gCAT-hr |
| 1 | A | 100 | 18 | 14.4 | 0.03 | 4.9 | 163 | 1938 |
| 2 | A | 300 | 18 | 14.4 | 0.32 | 51.7 | 162 | 672 |
| 3 | A | 100 | 18 | — | 0.006 | 1.2 | 200 | 1069 |
| 4 | B | 200 | 25 | 10 | 0.12 | 22.6 | 188 | 989 |
| 5 | C | 200 | 20 | 10 | 0.28 | 49.3 | 176 | 732 |
| 6 | D | 200 | 20 | 10 | 0.61 | 102 | 167 | 1491 |
| 7 | D | 200 | 10 | 20 | 0.53 | 92 | 174 | 1395 |
| 8 | D | 200 | 10 | — | 0.04 | 5.2 | 130 | 400 |
| 9 | D | 400 | 20 | 10 | 9.83 | —[5] | NA | 807 |
| 10 | D | 300 | 20 | 10 | 2.49 | 351 | 141 | 1114 |
| 11 | D | 200 | 20 | 10 | 0.60 | 100 | 167 | 1485 |
| 12 | D | 100 | 20 | 10 | 0.07 | 12.8 | 183 | 2682 |

TABLE III-continued
POLYMERIZATION RESULTS

| Run | Catalyst | H$_2$ (psig) | TIBAL/TTM | Promoter/TTM | MI | HLMI | MIR | gPE/ gCAT-hr |
|---|---|---|---|---|---|---|---|---|
| 13 | D[1] | 200 | 20 | 10 | 0.83 | 120 | 145 | 1447 |
| 14 | E | 200 | 20 | 10 | 0.15 | 36.1 | 237 | 1358 |
| 15 | F | 200 | 20 | 10 | 0.29 | 70.7 | 241 | 913 |
| 16 | G | 200 | 15 | 10 | 0.50 | 71.1 | 142 | 675 |
| 17 | H[2] | 200 | 25 | 10 | 0.42 | 33.3 | 79 | 1829 |
| 18 | I | 300 | 10 | — | 9.58 | 293 | 31 | 917 |
| 19 | I | 200 | 10 | — | 1.52 | 54.0 | 36 | 3231 |
| 20 | I | 100 | 10 | — | 0.36 | 13.2 | 37 | 4574 |
| 21 | J | 100 | 15 | 10 | 0.13 | 13.7 | 105 | 2293 |
| 22 | J | 150 | 15 | 10 | 0.73 | 65.4 | 90 | 2485 |
| 23 | J | 200 | 15 | 10 | 3.5 | 262 | 75 | 2493 |
| 24 | J | 200 | 15 | 10 | 3.5 | 249 | 71 | 2482 |
| 25 | J | 300 | 15 | 10 | 27.5 | —[5] | NA | 2098 |
| 26 | K | 200 | 5[3] | 30 | 0.49 | 44.1 | 90 | 1360 |
| 27 | K | 200 | 5 | 30 | 0.49 | 42.0 | 86 | 1710 |
| 28 | K | 200 | 20 | 10 | 0.40 | 38.0 | 95 | 1186 |
| 29 | K[4] | 50 | 5 | 30 | 0.04 | 3.8 | 95 | 1605 |
| 30 | K[4] | 50 | 5 | 30 | 0.17 | 14.9 | 88 | 1549 |
| 31 | L | 200 | 13 | 8 | 1.03 | 35.3 | 34 | 421 |

[1]Promoter = Freon 11
[2]2-liter reactor
[3]TEAL cocatalyst
[4]Copolymerization of ethylene with 1-butene
[5]Too high to measure

Observations

Catalyst A

Catalyst A is a vanadium-containing catalyst and exemplifies the use of EADC as a Lewis acid. A comparison of runs 1 and 2 demonstrates the effect of the hydrogen concentration in the reactor. As hydrogen concentration increases, MI and HLMI both increase. However, activity and MIR decrease.

A comparison of runs 1 and 3 shows the effect of the omission of a promoter with this vanadium-containing catalyst. Without the chloroform promoter, activity, MI, and HLMI all decrease, while the MIR increases.

Catalyst D

Catalyst D is a vanadium-containing catalyst utilizing DEAC as a Lewis acid. Runs 6 and 13 demonstrate a difference resulting from the use of different modifiers at the same ratio with respect to transition metal. Run 13, which uses Freon 11 as a modifier, results in a higher melt index at equivalent activity as compared to the use of chloroform. However, the lower MIR obtained with run 13 demonstrates that the use of Freon 11 provides a narrower molecular weight distribution than does chloroform.

A comparison of runs 6 and 7 demonstrates the results obtained using different ratios of chloroform as a modifier. In these cases, use of a higher ratio of modifier with respect to total transition metal provides a broader molecular weight distribution, but at the expense of lower activity.

Run 8 is an example of use of Catalyst D without a modifier, resulting in a drop of activity and narrowing of molecular weight distribution.

Runs 9–12 demonstrate the results obtained when varying the hydrogen concentration. With this catalyst, a higher hydrogen concentration gives narrower molecular weight distribution and lower activity.

Catalyst B v. Catalyst D

Catalyst B is an example of a vanadium-containing catalyst using EASC as a Lewis acid. A comparison of Catalyst B (run 4) with Catalyst D (run 6) demonstrates that Catalyst B provides lower activity but broader molecular weight distribution (i.e., higher MIR and a weaker MI response to hydrogen).

Catalyst C v. Catalyst D

Catalyst C is an example of a catalyst using SiCl$_4$ as a Lewis acid. A comparison of Catalyst C (run 5) with Catalyst D (run 6) demonstrate a broader molecular weight distribution (i.e., higher MIR) and weaker MI response to hydrogen concentration with Catalyst C.

Catalyst E v. Catalyst D

Catalyst E is an example of a vanadium-containing catalyst using additional optional steps (i.e., the use of an additional reducing agent, TNHAL) and SiCl$_4$ as the Lewis acid.

A comparison of Catalyst E (run 14) with Catalyst D (run 6) demonstrates similar activity with a much broader weight distribution (i.e., higher MIR) and a weaker MI response to hydrogen concentration with Catalyst E.

Catalyst E v. Catalyst F

Catalyst F is similar to Catalyst E but utilizes EADC as a Lewis acid in place of SiCl$_4$. A comparison of Catalyst F (run 15) with Catalyst E (run 14) demonstrates a stronger MI response to hydrogen concentration, and lower activity with Catalyst F. The molecular weight distributions (i.e., MIR) obtained with each of Catalyst E and F are approximately equivalent.

Catalysts E and F v. Catalyst G

Catalyst G is an example of a vanadium-containing catalyst utilizing SiCl$_4$ as a Lewis acid and an optional additional reducing (alkylating) agent, i.e., diethyl zinc. A comparison of Catalyst G (run 16) with Catalyst E (run 14) and Catalyst F (run 15) demonstrates that while Catalyst G provides lower activity and a narrower molecular weight distribution (i.e., lower MIR) than Catalysts E and F, the MI response to hydrogen of Catalyst G is stronger than that of Catalyst E, and substantially equivalent to that of Catalyst F.

Catalyst H

Catalyst H differs from Catalyst D in that it uses VOCl₃ as a catalyst-forming reactant rather than VCl₄. A comparison of Catalyst H (run 17) with Catalyst D (run 6) demonstrates that Catalyst H provides higher activity and narrower molecular weight distribution (lower MIR) than Catalyst D.

Catalyst I

Catalyst I is a titanium-containing catalyst utilizing a dialkyl magnesium compound as an alkylating agent. This catalyst demonstrates very high activity, an excellent MI response to hydrogen concentration, and relatively narrow molecular weight distribution.

Catalyst J

Catalyst J utilizes tetrabenzylzirconium and demonstrates that optional catalyst-forming steps are not required. Runs 21-25 present a study of the effect of hydrogen concentration which indicates that this catalyst system exhibits good MI response to hydrogen concentration. The activity of this catalyst is similar to others in the MI range of 0.1 to 3.5. At higher MIs, however, the activity decreases. (See Run 25.)

Catalyst K

This catalyst is an example of the use of lower molar ratios of zirconium and vanadium with respect to the silica support, as well as variation in the zirconium to vanadium ratio. A comparison of runs 26 and 27 demonstrate a difference of results from the use of different cocatalysts (i.e., TEAL in run 26 and TIBAL in run 27). With this catalyst, TIBAL provides higher activity, and both catalysts provide similar molecular weight distributions and MI response to hydrogen concentration.

A comparison of runs 27 and 28 demonstrates the differences obtained with different levels of cocatalyst and modifier. Run 27 demonstrated higher activity, narrower molecular weight distribution, and better MI response to hydrogen concentration than run 28.

Runs 29 and 30 demonstration copolymerization of ethylene with 1-butene. In run 30, a better MI response to hydrogen concentration and narrower molecular weight distribution were observed thus in Run 29. Run 29 provided a copolymer product having a density of about 0.960 g/ml, and run 30 provided a product having a density of about 0.945 g/mi.

Catalyst L

Catalyst L demonstrates the use of alumina as a useful support material in a vanadium-containing catalyst.

The foregoing detailed description is given for clearness of understanding only, and no unnecessary limitations are to be understood therefrom, as modifications within the scope of the invention will be apparent to those skilled in the art.

We claim:

1. A method of making polymers of one or more 1-olefins, said method comprising the step of polymerizing said one or more 1-olefins under polymerizing conditions by contact with a catalyst system comprising:
   (A) a solid catalyst component prepared by the method comprising the steps of:
   (a) directly contacting particles of a solid support material with a zirconium compound or complex under conditions whereby said zirconium compound or complex reacts with or precipitates on the surface of said support material to produce a contact product, said zirconium compound or complex being of a formula selected from the group consisting of $ZrR_aX_{4-a}$ and $Zr(OR)_aX_{4-a} \cdot (R^1OH)_x$ where R and $R^1$ are independently selected from the group consisting of $C_1$-$C_{20}$ alkyl, aryl, and alkaryl groups, a is zero or a positive integer of 1 to 4, inclusive, X is halogen, and x is zero or a positive number;
   (b) contacting the contact product of step (a) with a Lewis acid when said zirconium compound or complex is of the formula $Zr(OR)_aX_{4-a} \cdot (R^1OH)_x$ where a is a positive integer of 1 to 4, inclusive, and, optionally, with an alkylating agent to produce an intermediate product;
   (c) optionally isolating and washing the contact product of step (a) or said intermediate product of step (b) to remove soluble reaction by-products therefrom to produce a washed product; and,
   (d) reacting the contact product of step (a), the intermediate product of step (b), or the washed product of step (c) with a compound of titanium or vanadium to produce a solid catalyst component;
   provided that when said zirconium compound is of the formula $ZrR_aX_{4-a}$ step (c) or step (d) is directly carried out on the contact product of step (a); and,
   (B) an effective amount of a cocatalyst or effective amounts of a cocatalyst and a modifier.

2. The method of claim 1 wherein said polymerizing step is carried out in a single reactor.

3. The method of claim 1 wherein said polymerizing step is carried out in the presence of hydrogen.

4. The method of claim 3 wherein one or more of a Lewis acid and an alkylating agent are introduced to said solid catalyst component during preparation thereof.

5. The method of claim 4 wherein said Lewis acid is diethylaluminum chloride and said alkylating agent is a trialkylaluminum compound.

6. The method of claim 1 wherein said polymerizing step is carried out under slurry, gas phase, or solution polymerization conditions.

7. The method of claim 6 wherein said polymerizing step is carried out at a temperature in the range of 0° to 250° C., inclusive, and at a pressure in the range of atmospheric pressure to 30,000 psig, inclusive.

8. The method of claim 1 wherein ethylene is homopolymerized.

9. The method of claim 1 wherein ethylene is copolymerized with at least one 1-olefin having three to twelve carbon atoms.

10. The method of claim 1 wherein a 1-olefin having three to twelve carbon atoms is homopolymerized.

11. The method of claim 1 wherein two or more 1-olefins having three to twelve carbon atoms are copolymerized.

12. The method of claim 1 wherein said cocatalyst comprises a compound selected from the group consisting of alkyl and alkoxy compounds of zinc and metals of Groups IIA and IIIA of the Periodic Table and tetraisobutyl dialuminum oxide.

13. The method of claim 12 wherein said cocatalyst is a trialkyl aluminum compound.

14. The method of claim 13 wherein said cocatalyst is triisobutylaluminum.

15. The method of claim 1 wherein said cocatalyst is present in said system in an amount of up to about 200 moles of cocatalyst per mole of zirconium, titanium and vanadium in said solid catalyst component.

16. The method of claim 15 wherein said cocatalyst is triisobutylaluminum and is present in said system in an amount of about 15 to about 20 moles per mole of zirconium, titanium and vanadium in said solid catalyst component.

17. The method of claim 1 wherein said catalyst component comprises a vanadium compound and said cocatalyst includes an effective amount of an activity-increasing modifier.

18. The method of claim 17 wherein said modifier is selected from the group consisting of halogenating agents of the formula $M^2H_iX_{j-i}$ wherein $M^2$ is selected from Si, C, Ge and Sn, X is halogen, i is 0, 1, 2 or 3, and j is the valence of $M^2$, saturated aliphatic halohydrocarbons, olefinically unsaturated aliphatic halohydrocarbons, acetylenically unsaturated aliphatic halohydrocarbons, aromatic halohydrocarbons, and olefinically unsaturated halogenated carboxylates.

19. The method of claim 17 wherein said modifier is a halocarbon compound of the formula $R^6{}_kCX_{4-k}$ wherein $R^6$ is hydrogen or an unsubstituted or halogen-substituted saturated hydrocarbon having 1 to 6 carbon atoms, X is halogen, and k is 0, 1 or 2.

20. The method of claim 17 wherein said modifier comprises an alkyl halide.

21. The method of claim 17 wherein said modifier comprises an alkyl chloride selected from the group consisting of chloroform and chlorofluorocarbons.

22. The method of claim 17 wherein said modifier is present in said system in an amount of about 1 to about 50 moles of modifier per mole of zirconium, titanium and vanadium in said solid catalyst component.

23. The method of claim 22 wherein between about 20 and 40 moles of said modifier are present per mole of zirconium, titanium and vanadium.

24. The method of claim 1 wherein said step (b) is carried out and said zirconium compound or complex and said Lewis acid form a reaction product bound to or precipitated on said support surface.

25. The method of claim 1 wherein said alkylating agent is selected from the group consisting of aluminum-, magnesium, and zinc-containing alkylating agents.

26. The method of claim 25 wherein said alkylating agent is selected from trialkyl aluminum, dialkyl magnesium, and dialkyl zinc compounds.

27. The method of claim 1 wherein said zirconium compound or complex is of the formula $Zr(OR)_4 \cdot (R^1OH)_x$ where R and $R^1$ are independently selected from the group consisting of $C_1$–$C_{20}$ alkyl, aryl and alkaryl groups and x is zero or a positive number.

28. The method of claim 1 wherein said zirconium compound or complex is of the formula $Zr(OR)_2Cl_2$.

29. The method of claim 1 wherein said step (b) is carried out and the contact product of step (a) is contacted with a molar excess with respect to said zirconium compound or complex of said Lewis acid.

30. The method of claim 1 wherein said zirconium compound or complex is tetrabenzyl zirconium.

31. The method of claim 1 wherein said step (b) is carried out and said Lewis acid is selected from the group consisting of metallic halides, organometallic halides, compounds of the formula $SiX_bR^2{}_{4-b}$ where b is an integer of 1 to 4, inclusive, $R^2$ is hydrogen or an alkyl group of 1 to 10 carbon atoms, and X is halogen, and mixtures thereof.

32. The method of claim 31 wherein said Lewis acid is selected from $SiX_4$ and $R^3{}_cAlX_{3-c}$ where $R^3$ is an alkyl group of 1 to 10 carbon atoms and c is 1 or 2, $R^4{}_3Al_2X_3$ wherein $R^4$ is an alkyl group of 1 to 4 carbon atoms, and $MX_d$ where M is a metal, d is the valence of M, and mixtures thereof.

33. The method of claim 32 wherein said Lewis acid is selected from the group consisting of $SiCl_4$, $R^3AlCl_2$, $R^3{}_2AlCl$, $R^4{}_3Al_2Cl_3$, and $BCl_3$.

34. The method of claim 33 wherein said Lewis acid is selected from $SiCl_4$ and $R^3AlCl_2$ and said intermediate product of step (b) is washed and then reacted with a trialkyl aluminum, dialkyl magnesium, or dialkyl zinc alkylating agent prior to step (c) or (d).

35. The method of claim 1 wherein said titanium or vanadium compound of step (d) is selected from the group consisting of $Ti(OR^5)_eX_{4-e}$, $VO(OR^5)_fX_{3-f}$, and $V(OR^5)_gX_{4-g}$, and mixtures thereof, wherein each $R^5$ is the same or different alkyl group of 1 to 20 carbon atoms, e and g are each independently zero or an integer of 1 to 4, inclusive, f is zero or an integer of 1 to 3, inclusive, and X is halogen.

36. The method of claim 35 wherein said titanium or vanadium compound of step (d) is selected from the group consisting of $TiCl_4$, $VCl_4$, $VOCl_3$, and mixtures thereof.

37. The method of claim 1 wherein each of steps (a) and (d) is carried out in the presence of an inert liquid hydrocarbon, each of said zirconium compound or complex and said titanium or vanadium compound is hydrocarbon soluble, and said method comprises the additional step of separating the solid catalytic product of step (d) from said hydrocarbon of step (d) to produce a free-flowing solid catalyst component.

38. The method of claim 37 wherein said solid support material is selected from materials of the formula $SiO_2 \cdot hAl_2O_3$ where h is zero, 1 or 2, alumina, MgO and $MgCl_2$, said zirconium compound or complex is of the formula $Zr(OR)_4(R^1OH)_x$ where R and $R^1$ are independently $C_1$–$C_{20}$ alkyl groups and x is zero or a positive number, and said titanium or vanadium compound of step (d) is selected from $VCl_4$, $VOCl_3$, and mixtures thereof.

39. The method of claim 38 wherein the ratio of said zirconium compound or complex to said support material in step (a) is up to about 3 mmoles of zirconium compound or complex per gram of support material, the molar ratio of said Lewis acid to the contact product of step (a) is about 2:1 to about 10:1, and the ratio of said titanium or vanadium compound to said support material is in the range of about 0.01 to about 2 moles of titanium or vanadium compound per gram of support material.

40. The method of claim 39 wherein said intermediate product of step (b) is washed and then reacted with a molar excess of a trialkyl aluminum, dialkyl magnesium, or dialkyl zinc alkylating agent with respect to said zirconium compound or complex prior to step (c).

* * * * *